US008561014B2

(12) United States Patent
Mengusoglu et al.

(10) Patent No.: US 8,561,014 B2
(45) Date of Patent: Oct. 15, 2013

(54) EXTRACTING A SYSTEM MODELLING META-MODEL LANGUAGE MODEL FOR A SYSTEM FROM A NATURAL LANGUAGE SPECIFICATION OF THE SYSTEM

(75) Inventors: Erhan Mengusoglu, Southampton (GB); John B. Pickering, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 12/762,881

(22) Filed: Apr. 19, 2010

(65) Prior Publication Data

US 2010/0275179 A1    Oct. 28, 2010

(30) Foreign Application Priority Data

Apr. 23, 2009  (EP) ..................................... 09158604

(51) Int. Cl.
*G06F 9/44* (2006.01)
*G06F 9/45* (2006.01)
*G06F 17/27* (2006.01)

(52) U.S. Cl.
USPC ................ 717/104; 717/108; 717/136; 704/9

(58) Field of Classification Search
USPC ......................................................... 717/104
See application file for complete search history.

(56) References Cited

U.S. PATENT DOCUMENTS

| | | | |
|---|---|---|---|
| 5,495,413 A * | 2/1996 | Kutsumi et al. | 704/4 |
| 6,275,976 B1 | 8/2001 | Scandura | |
| 7,392,509 B2 | 6/2008 | Sinha et al. | |
| 7,499,850 B1 * | 3/2009 | Neubauer et al. | 704/9 |
| 7,606,782 B2 * | 10/2009 | Haley | 706/50 |
| 7,970,601 B2 * | 6/2011 | Burmester et al. | 704/9 |
| 2007/0168929 A1 * | 7/2007 | Larvet et al. | 717/104 |
| 2008/0097748 A1 | 4/2008 | Haley et al. | |

FOREIGN PATENT DOCUMENTS

WO    2007056807 A1    5/2007

OTHER PUBLICATIONS

Rachel L. Smith, George S. Avrunin, and Lori A. Clarke. From Natural Language Requirements to Rigorous Property Specification. In Workshop on Software Engineering for Embedded Systems (SEES 2003): From Requirements to Implementation, pp. 40-46, Sep. 2003.*
Bryant et al., "From Natural Language Requirements to Executable Models of Software Components", Proceedings of the 2003 Monterey Workshop on Software Engineering for Embedded Systems, Sep. 24-26, 2003, Chicago, IL 2003, pp. 51-58.*
Gelhausen, T. and Tichy, W. F., "Thematic Role Based Generation of UML Models from Real World Requirements", in Proc. Int. Conf. Semantic Computing, ICSC 2007, IEEE Computer Soc. (2007), p. 282-289.
Ilieva, M. G. and Ormadjieva, O., "Automatic Transition of Natural Language Software Requirements Specification into Formal Presentation", Lecture Notes in Computer Science, vol. 3513/2005, p. 392-397.

* cited by examiner

*Primary Examiner* — James D Rutten
(74) *Attorney, Agent, or Firm* — A. Bruce Clay (57) ABSTRACT

A system modeling meta-model language model for a system is extracted from a natural language specification of the system. Syntactic structure is extracted from the specification of a system. The syntactic structure represents a set of at least one syntactic subject. A first mapping is created between a predetermined set of the at least one syntactic subject and respective meta-model elements for a system modeling meta-model language. At least one of the meta-model elements is constructed in accordance with the mapping for each identified syntactic subject. The created meta-model structural elements are created for conversion into a model of the system.

20 Claims, 10 Drawing Sheets

The Booking System

The booking system is accessed via the order entry application. This collects details from users including the destination, the price and any special conditions relating to the holiday being booked.

This information is used to create one or more bookings. The booking may be cancelled or confirmed at any time. It is recorded with information about the date, whether it's been paid for or not, the price and the number of passengers travelling on that booking.

Passengers are associated with a name and an address. A credit check may be performed about them; and they will receive a bill for any booking. Passengers may be of two types: either individuals, who will also have identified how they will pay, or a party of individuals. Parties have to be defined in terms of number of individuals and a contact name for the group.

```
<topic>
    <article>the +{DEFINITE}+{UNKNOWN ANTECEDENT}</article>
    <noun attributes= "date made", "payment",
    "received", "price",
    "number of passengers">booking system +{ADMIN}+{AUTOMATION}+{SALES}</noun>
</topic>
<comment>
    <verb phrase>
        <auxiliary>is +{TO BE}+{PASSIVE}</auxiliary>
        <participle>accessed +{ENTRY}+{RECIPIENT}</participle>
    </verb phrase>
    <prepositional phrase>by the +{MEANS}+{OBJECT}</ prepositional phrase>
    <noun attributes= "destination", "price",
    "special conditions">order +{SALES}+{RECORD}entry +{ENTRY}+{RECIPIENT}</noun>
</comment>
```

| Ontology to Metamodel Mapping Table | | |
|---|---|---|
| Ontology Syntactic & Semantic elements | Ecore Types | UML Types |
| <Noun>; <Noun Phrase> | EClass | Class |
| {Qualifier}; {Feature}; {Complement} | EAttribute | Attribute |
| <Verb Phrase>+{Passive}; {Containment}; {Requirement}; {Is_Type} | EReference | Association |
| <Verb Phrase>+{{Active}+{Effective}} | EOperation | Class Function |
| surface strucutre | EName | Name |

EClass: booking
    EName: "Booking"
    EAttribute: dateMade
    EAttribute: isPaid
    EAttribute: passengers
    EAttribute: price
    EOperation: confirm
    EOperation: cancel
    EReference: <association> ERefType: Passenger
    EReference: <association> ERefType: Order Entry EClass: passenger
    EName: "Passenger"
    EAttribute: name
    EAttribute: address
    EOperation: creditRating
    EOperation: sendBill
    EReference: <generalisation> ERefType: Party
    EReference: <generalisation> ERefType: Individual EClass: order entry
    EName: "Order Entry"
    EAttribute: destination
    EAttribute: price
    EAttribute: specialConditions
    EOperation: takeDetails EClass: party
    EName: "Party"
    EAttribute: contactName
    EAttribute: number EClass: individual
    EName: "Individual"
    EAttribute: paymentMethod

EXTRACTING A SYSTEM MODELLING META-MODEL LANGUAGE MODEL FOR A SYSTEM FROM A NATURAL LANGUAGE SPECIFICATION OF THE SYSTEM

REFERENCE TO RELATED APPLICATIONS

The current application is related to co-owned and co-pending European Patent Application 09158604.0 filed on Apr. 23, 2009 and entitled A METHOD, APPARATUS OR SOFTWARE FOR AUTOMATICALLY EXTRACTING A SYSTEM MODELLING META-MODEL LANGUAGE MODEL FOR A SYSTEM FROM A NATURAL LANGUAGE SPECIFICATION OF THE SYSTEM, which is incorporated herein by reference.

BACKGROUND

The present invention relates, in general, to specification modeling, and more particularly, to extracting a language model for a system from a natural language specification.

When engineering complex systems, such as software systems, the system is commonly defined in a natural language functional specification. An important precursor to creating the system in accordance with the functional specification is the production of a model of the system. In order to create such a model, the functional specification must first be interpreted and summarized by domain experts before being converted into a model of the system in a given modeling specification language or meta-model language. Once the meta-model language model has been created it can be further converted into a model encapsulating the concepts and behaviors defined by the functional specification.

BRIEF SUMMARY

In accordance with an embodiment of the invention, a method extracts a system modeling meta-model language model for a system from a natural language specification of the system. A natural language specification of a system is stored in a computer memory. Syntactic structure is extracted from the natural language specification of a system. The syntactic structure represents a set of at least one syntactic subject. A first mapping is created between a predetermined set of the at least one syntactic subject and respective meta-model elements for a system modeling meta-model language. At least one of the meta-model elements is constructed in accordance with the mapping for each identified syntactic subject. The created meta-model structural elements are created for conversion into a model of the system.

Another embodiment provides an apparatus for extracting a system modeling meta-model language model for a system from a natural language specification of the system. The syntactic structure is extracted from a natural language specification of a system. The syntactic structure represents a set of at least one syntactic subject. A first mapping is created between a predetermined set of the at least one syntactic subject and respective meta-model elements for a system modeling meta-model language. At least one meta-model element is created in accordance with the mapping for each identified syntactic subject. The created meta-model structural elements are provided for conversion into a model of the system.

A further embodiment provides a computer program product for extracting a system modeling meta-model language model for a system from a natural language specification of the system. The computer program product comprises a computer readable storage medium having computer readable program code embodied therewith. The computer readable program code is configured to extract syntactic structure from a natural language specification of a system. The syntactic structure represents a set of at least one syntactic subject. Computer readable program code is configured to create a first mapping between a predetermined set of at least one syntactic subject and respective meta-model elements for a system modeling meta-model language. Computer readable program code is configured to create at least one meta-model element in accordance with the mapping for each identified syntactic subject. Computer readable program code is configured to provide the created meta-model structural elements for conversion into a model of the system.

DETAILED DESCRIPTION

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
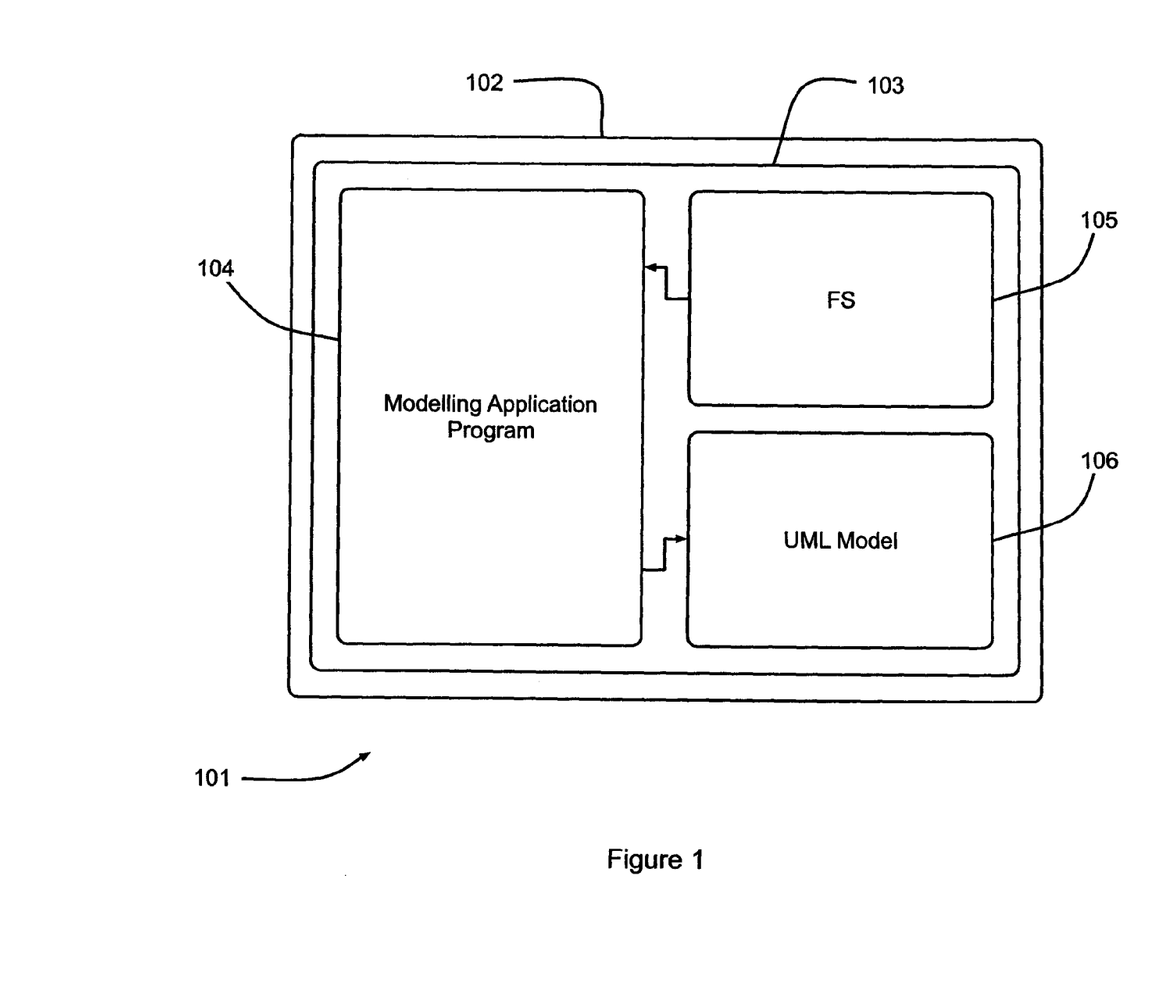
FIG. 1 is a schematic illustration of a computer system providing a modeling system provided by a modeling application program.

With reference to FIG. 1, a computer system 101 comprises a computer 102 provided with an operating system 103. The operating system 103 provides a platform for an application program in the form of a modeling application program 104. The modeling application program 104 is arranged to input a natural language specification such as a functional specification (FS) 105 for a system and to create a conceptual model of the system described in the FS 105 in the form of a Unified Modeling Language (UML) model 106.

Figure 2:
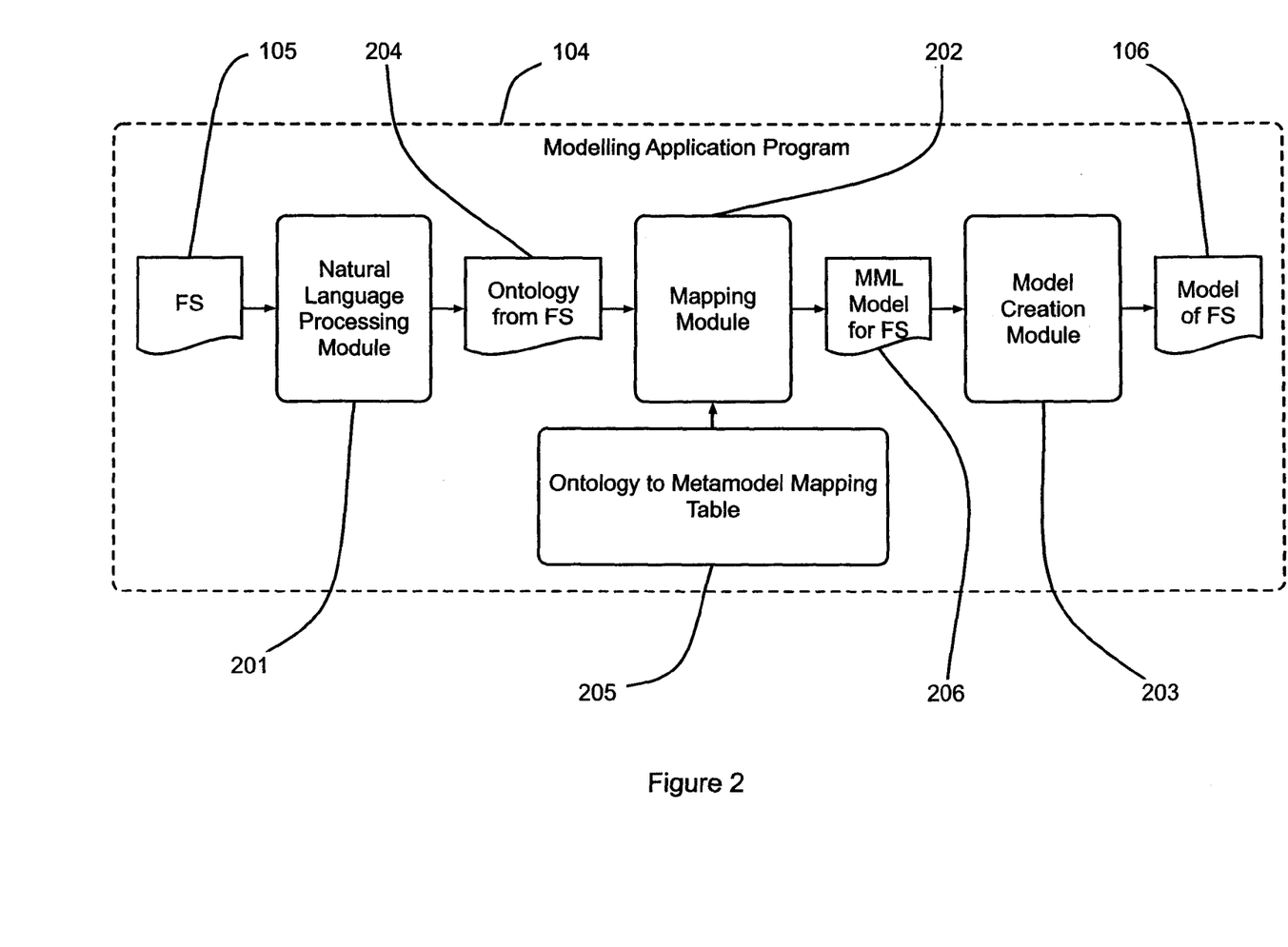
FIG. 2 is a schematic illustration of components of the modeling application program of FIG. 1.

With reference to FIG. 2, the modeling application program comprises three main components in the form of a natural language processing (NLP) module 201, a mapping module 202 and a model creation module 203. The natural language processing (NLP) module 201 is arranged to input the natural language FS 105 and extract syntactic and semantic data from the FS 105 and to output the extracted data in the form of an ontology 204 for the FS 105. The processing performed by the NLP module 201 is described in further detail below.

The ontology 204 is input to the mapping module 202, which maps elements of the ontology 204 into a meta-model language for the output Unified Modeling Language (UML) model 106. In the present embodiment, the meta-model language is Ecore™ which is part of the Eclipse™ platform provided by the Eclipse™ Foundation, Inc. (Ecore, and Eclipse are trademarks of the Eclipse Foundation, Inc.). The mapping performed by the mapping module 202 is performed in accordance with a mapping table 205, which provides mappings between a predetermined set of syntactic and semantic elements of the ontology 204, and structural elements and relations in the meta-model language. The output of the mapping module 202 is a model 206 of concepts from the FS 105 defined in the meta-model language (MML). The MML model 206 is input to the model creation module 203 where it is converted into a UML model of functional concepts from the FS 105. The UML model 106 may then be used for the manual or automatic creation of the system defined by the FS 105. For example, if the FS 105 describes a software system, the UML model may be used for the automated production of the defined software system.

Figure 3:
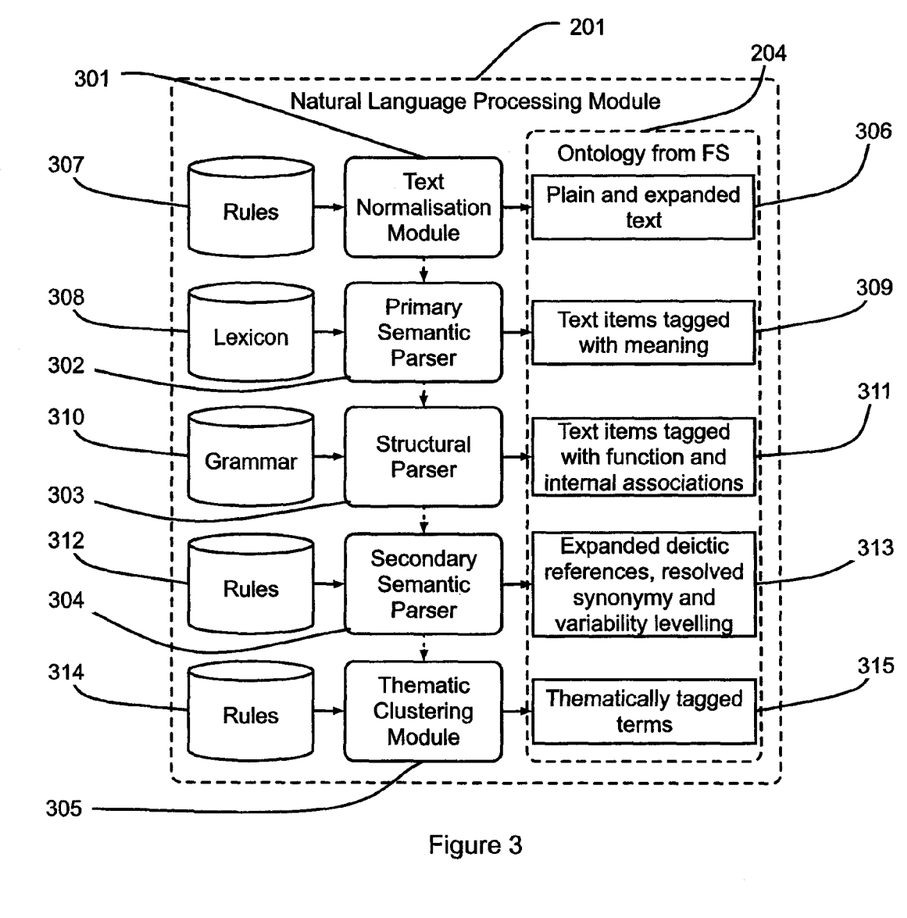
FIG. 3 is a schematic illustration of a natural language processing module of the modeling application program of FIG. 2.

With reference to FIG. 3, the NLP module 201 comprises a text normalization module 301, a primary semantic parser 302, a structural parser 303, a secondary semantic parser 304 and a thematic clustering module 305. These modules 301, 302, 303, 304, and 305 work together to extract respective aspects of the ontology 204 from the FS 105. The text normalization module 301 is arranged to remove textual effects from the FS 105, such as, capitalization, emboldening or italicization and to expand abbreviations and acronyms so as to convert the FS 105 into plain text 306. The text normalization module 301 performs this conversion in accordance with a set of rules 307 that define the textual effects that need to be identified, and the process for converting such features into plain text.

The FS 105, in plain text, is then input to the primary semantic parser 302, which uses a lexicon 308 to identify relevant semantics for each word in the form of semantic qualifiers or attributes. Each word in the plain text FS 105 is augmented with one or more tags comprising the relevant identified semantic qualifiers and attributes. The lexicon 308 contains information relevant to the semantic interpretation of all word types, such as nouns, verbs, adjectives and adverbs. For example, the lexicon 308 is arranged to distinguish between verbs that imply some activity in the form of an action and a result and verbs that indicate a state or ownership. Thus the semantic parser 302 is arranged to identify dynamic verbs, otherwise known as effective verbs, and distinguish them from stative verbs (a verb which asserts that one of its arguments has a particular property). In other words, qualifying verbs, such as, "to be," "contain," "involve," and "imply," are treated as attributes associated with a respective noun and are distinguished from other verbs, such as, "to send," "to receive," and "to modify," that may affect other concepts. For example, given the two phrases:

"The first component comprises four features."

"The first component will contact the database."

The verb "comprise" suggests a containment relationship, whereas "contact" suggests an operation or activity. Thus, the output (text items tagged with meaning 309) of the primary semantic parser 302 is a plain text FS 105 with each word tagged with its meaning according to the lexicon 308. The semantically tagged plain text FS (text items tagged with meaning 309) is then input to the structural parser 303.

The structural parser 303 is arranged to analyze the syntactic structure and relationships of its input in relation to a grammar 310 defined as a set of grammar rules. Thus the structural parser 303 identifies the syntactic function of each word and, in addition, the syntactic relationships and associations that may exist between given words and phrases. For example, the grammar 310 provides rules for analyzing actions so as to identify the initiator and recipient of an action along with any intended goal or outcome of the action. Given the following phrase in the FS 105:

"The process involves three components."

The grammar rules are arranged to identify the syntactic structures, shown in curly brackets, as follows:

{DEFINITE ARTICLE} the
{NOUN} {SUBJECT} process
{VERB} {$3^{rd}$ PERSON SINGULAR} involves
{NUMERICAL QUALIFIER} {CARDINAL} three
{NOUN} {OBJECT} components For example, the grammar rules identify syntactic structures such as noun phrases or verb phrases along with component and other syntactic elements such as nouns, verbs and the subject and object of verbs or qualifiers. In the one embodiment, the syntactic analysis also divides the syntactic elements of a given sentence into a topic and related comment. The topic commonly equates to the sentence or syntactic subject and the comment to the sentence or syntactic predicate, as is the case in the example above, which becomes:

Topic:
{DEFINITE ARTICLE} the
{NOUN} {SUBJECT} process
Comment:
{VERB} {$3^{rd}$ PERSON SINGULAR} involves
{NUMERICAL QUALIFIER} {CARDINAL} three
{NOUN} {OBJECT} components In other examples, the topic may equate to a sentence predicate and the comment to its subject.

In addition, the grammar rules identify various types of associations between elements such as containment, generalization or requirement relationships. A containment relationship indicates that one entity comprises one or more other entities. A generalization relationship indicates that a given entity is an example of a group of entities having common attributes. A requirement relationship indicates that an entity is a required part of another. From the example above, the grammar rules would identify that the three components have a containment relationship with the process, and, conversely, the components have a requirement relationship with the process. These relationships may be represented as follows:

component {CONTAINMENT} process;
process {REQUIREMENT} component.

As noted above, the grammar rules are also arranged to identify the initiator and recipient of a given action and any objective of such an action. Given the following phrase in the FS 105:

"The first component must send requests to the second for monitoring data."

The grammar rules are arranged to identify that the first component (component1) initiates an action (send request) with a parameter (monitoring data) to the second component (component2).

This identifies a relationship between the two components and monitoring data, as well as identifying an action between the components involving the monitoring data object. This grammatical relationship may be represented as follows:

Send request {INITIATOR} component1;
Send request {OBJECTIVE} monitoring data;
Send request {RECIPIENT} component2.

Thus, the output (text items tagged with function and internal associations 311) of the structural parser 303 comprises a representation of the content of the FS 105 with the syntactic structure, elements and relationships identified by appropriate tags.

The output (text items tagged with function and internal associations 311) from the structural parser 303 is input to the secondary semantic parser 304. The secondary semantic parser 304 is arranged to identify anaphoric (instances of an expression referring to another) references and then to perform deictic (of or relating to a word, the determination of whose referent is dependent on the context in which it is said or written) expansion to resolve oblique, non self-explanatory references in accordance with a set of rules 312. For example, descriptive and declarative text commonly uses syntactic mechanisms such as pronouns or qualifiers to avoid repetition, as in the following example:

"The process involves three components. It uses these to check integrity. Each of them in turn comprises four sub-components."

The secondary semantic parser 304 is arranged to identify the use of the pronouns "it," "these," and "them" and to resolve or expand them to their respective appropriate noun phrases. In the example above, "it" resolves to "the process" and "these" and "them" are resolved to "the three components" in accordance with the appropriate rules 312.

The secondary semantic parser 304 is further arranged to perform an additional sub-process beyond what would normally be done in linguistic processing. Natural language commonly uses total or partial synonymy where, for stylistic reasons, a number of different noun phrases may be used to refer to a common or partially common object. In other words, partial or total overlap in meaning results from different lexical items being used. Variability leveling is a process for resolving such synonymy. Consider the following:

"There are three components for software, hardware and interface management. These modules fulfill the following functions."

The terms "component," "software (management)," "hardware (management)," "interface (management)" and "modules" refer to the same concept. In addition, the relationship between "component" and "software," "hardware" and "interface management" is clear. However, it is not initially clear whether these elements are subtypes of component or whether they are the components for the system itself. The variability leveling process performed by the secondary semantic parser 304 is arranged to resolve this ambiguity with reference to the entire FS 105. The secondary semantic parser 304 initially retains all of the noun phrases (component, software management, hardware management and interface management). If, by the end of the document, "component" is associated with no other concepts, it is flagged for possible deletion.

The remaining noun phrases (software management, hardware management and interface management) are then processed to establish whether they share any associated terms, such as features they contain or operations they perform. If they share any such features or operations, then they are associated with the generic term "component" and marked as subtypes of that generic term. Otherwise, the generic term "component" already flagged for suppression is removed.

Thus the output (expanded deictic references, resolved synonymy and variability leveling 313) of the secondary semantic parser 304 comprises expanded anaphoric and deictic references and resolved synonymy with variability leveling.

The final stage of the NLP module 201 is the thematic clustering module 305, which is arranged to take the cumulative output of the previous stages. Using the semantic tags added by the primary semantic parser 302, common semantic themes are identified in the terms of the ontology 204 and tagged with theme identifiers so as to distinguish each such identified group. The thematic clustering is performed in accordance with a set of rules 314. The output of the thematic clustering module 305 is a set of tags (thematically tagged terms 315) associated with the terms of the ontology that uniquely identifies terms common to each of the identified themes.

Figure 4:
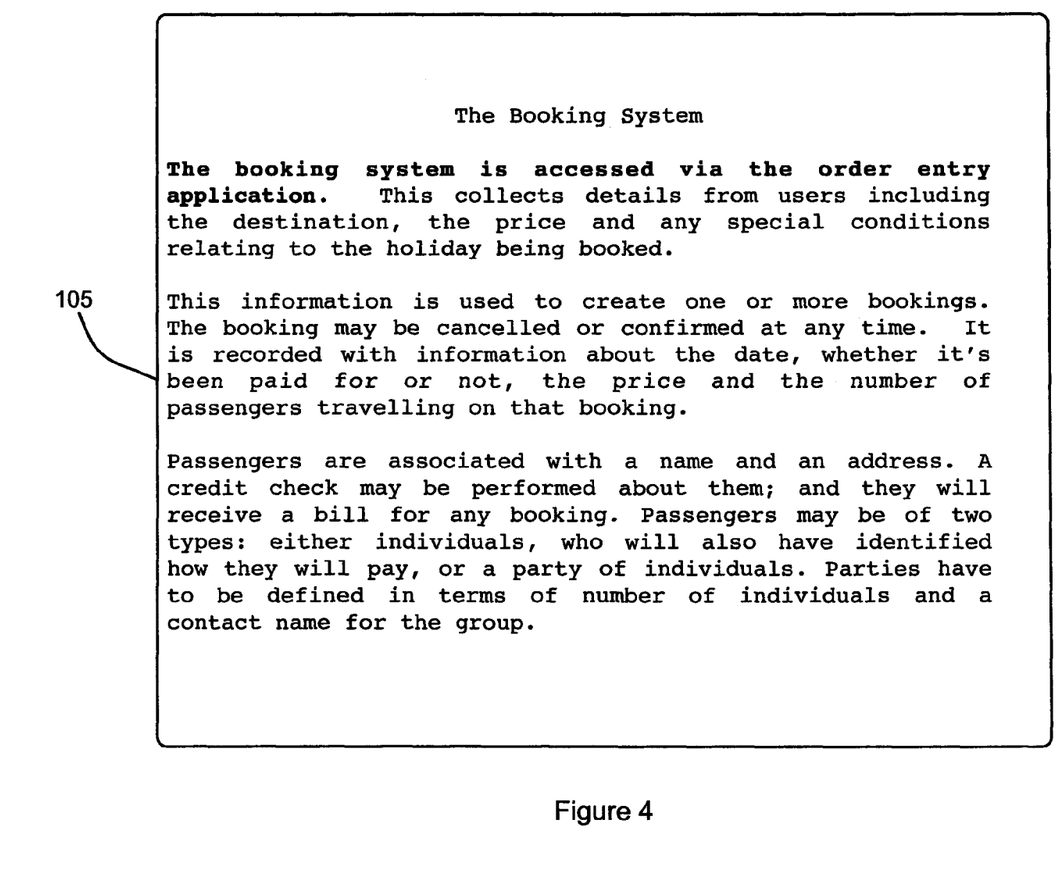
FIG. 4 is a sample of a natural language functional specification for processing by the modeling application program of FIG. 2.
Figure 5:
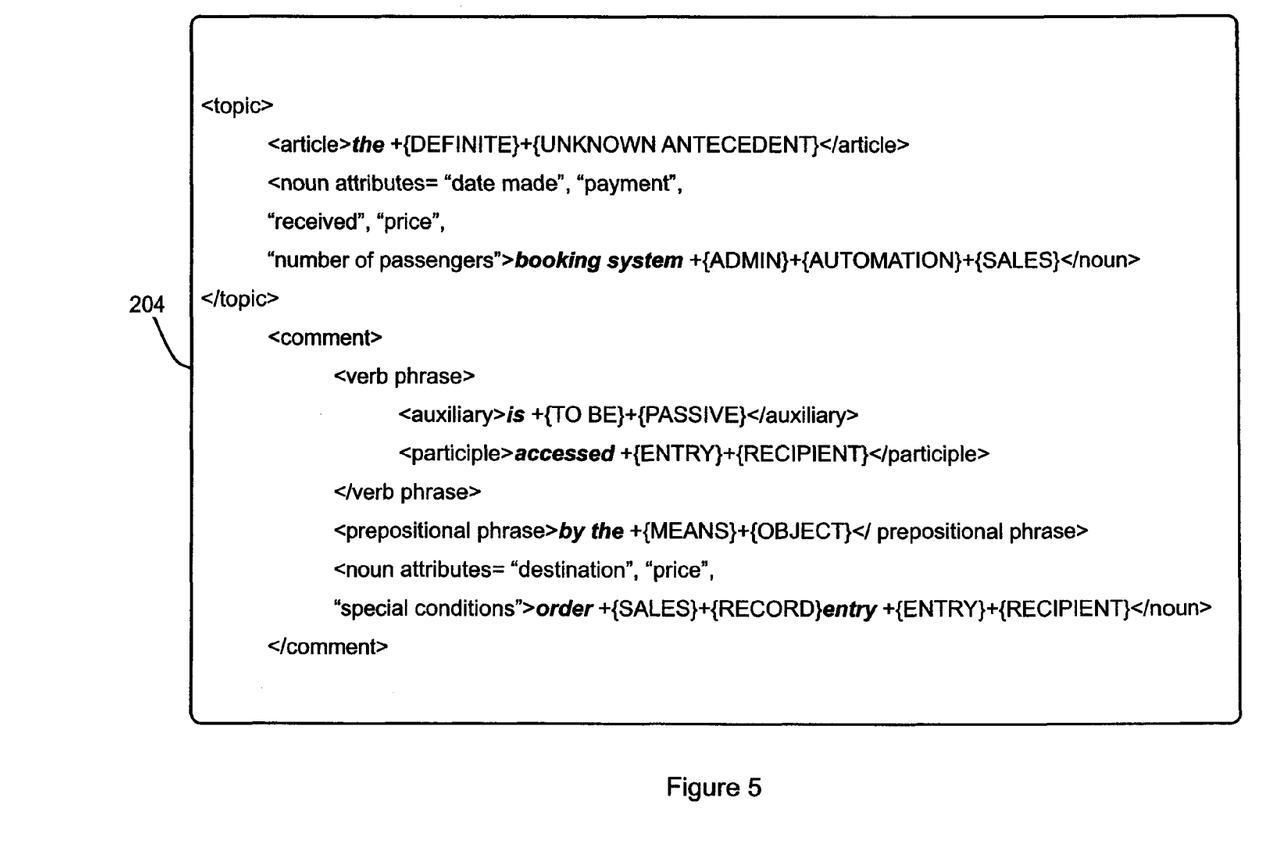
FIG. 5 is an ontology extracted from the natural language functional specification of FIG. 4 by the natural language processing module of FIG. 3 for the first sentence of the functional specification of FIG. 4.

FIG. 4 shows the first three paragraphs of an example functional specification 105 for a computerized booking system suitable for input to the NLP module 201. FIG. 5 shows the extracted ontology 204 for the first sentence of the FS 105 shown in bold in FIG. 4. The ontology 204 comprises a set of syntactic elements arranged hierarchically and each enclosed between syntactic start and end labels in the form of a syntactic label enclosed in angled brackets (<syntactic label>) and angled brackets enclosing a forward slash preceding the syntactic label (</syntactic label>), respectively. The hierarchy is primarily divided into topic and comment sections that, for example, may equate to the sentence subject and predicate. Within each primary division, further syntactic elements such as noun phrases, verb phrases, prepositional phrases and their respective syntactic components are arranged hierarchically in accordance with the grammar 310, and labeled accordingly. The surface structure, that is, the words themselves from the FS 105 are denoted by bold type adjacent to their respective syntactic labels. Where applicable, the semantic tags inserted by the primary semantic parser 302 in accordance with the lexicon 308 follow the respective surface structure and are denoted with curly brackets ({ }). In FIG. 5, the noun components are associated with attributes, that is, related terms or characteristics. In programming terms, these equate to the parameters of a function or method call. In text analysis, these are nouns commonly used to describe or expand the head noun itself either in other sections of the functional specification or within the semantic definition supplied in the lexicon 308. For the ontology of FIG. 5, following common practice for mark-up languages, attributes are listed within the noun tags.

Figure 6:
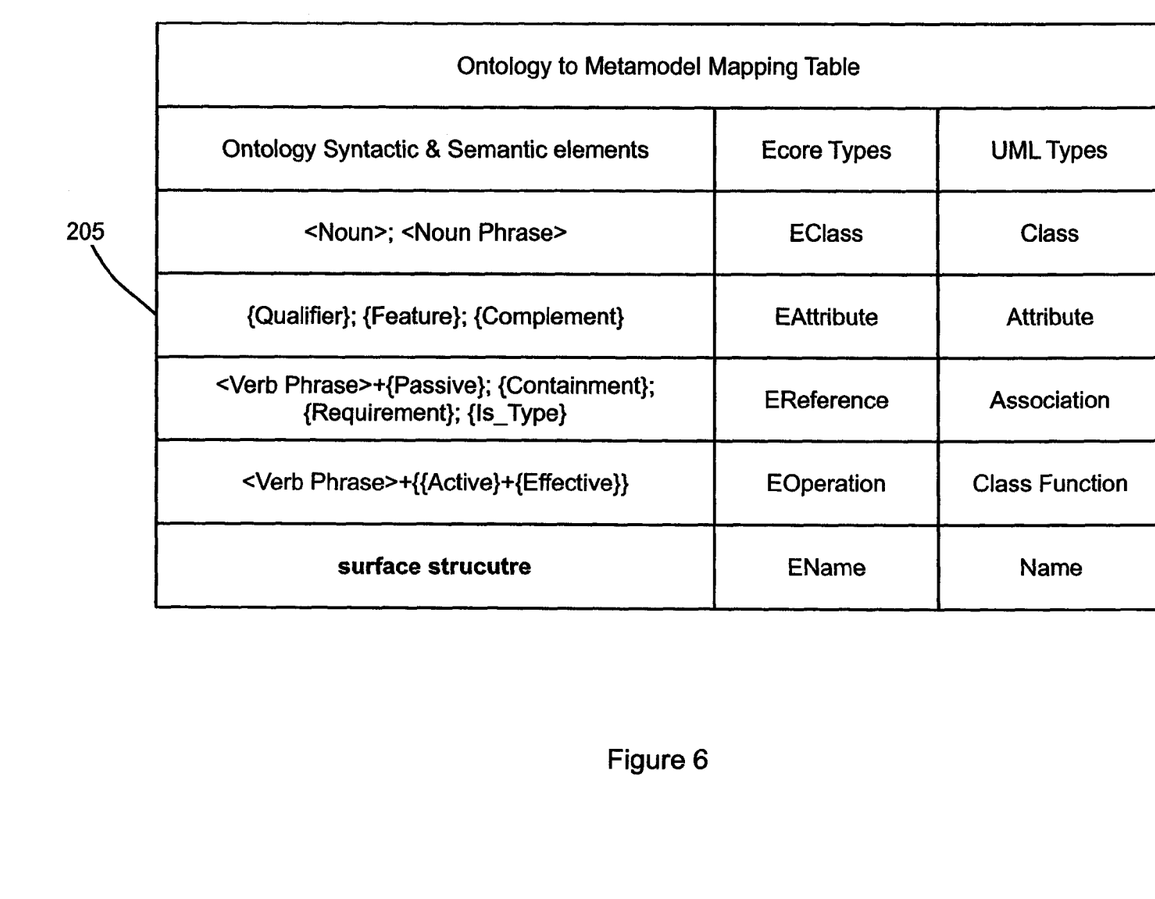
FIG. 6 is a mapping table used in the modeling application program of FIG. 2.

As noted above, the mapping module 202 is arranged to map elements from the extracted ontology 204 into an MML model 206 in accordance with the mapping table 205. FIG. 6 shows an example of the mapping table 205, which, in one embodiment, is arranged to map English natural language elements from the ontology 204 to a meta-model language (MML) in the form of, for example, Ecore concepts. Each identified noun or noun phrase is mapped to an EClass, which is equivalent to a UML Class. Any semantic qualifier, feature or complement for a given noun or noun phrase is added to the appropriate EClass as an EAttribute, which is equivalent to a UML Attribute. Each identified verb or verb phrase, which is also defined in its associated semantics as passive, is mapped as an EReference between the relevant classes created for the subject and object of the verb as defined in the syntax. Similarly, containment, requirement and generalization ({Is_Type}) relationships identified by semantic tags are added as EReferences between the relevant EClasses. Continuing the containment/requirement example above, both the relevant nouns are mapped to EClasses as follows:

EClass: process

EClass: component

The containment/requirement relationship would then be mapped as EReferences between those two EClasses as follows:

EClass: process

EReference: type: component is containment=yes

EClass: component

EReference: type: process is containment=no

Where a verb or verb phrase is defined in its associated semantics as active and effective, it is mapped to an EOperation for the relevant EClass. The surface structure, that is, the words of the actual FS 105 are used as the EName for the relevant Ecore structure. In summary, in the present embodiment, noun phrases are mapped to EClasses, intransitive/passive verb phrases are mapped to EReferences and transitive verbs that generate a result (effective) are mapped to EOperations for the EClass semantically identified as the initiator of the action. Containment, requirement and generalization relationships are mapped to appropriately directional EReferences, the directionality is determined from the associated semantics.

Figure 7:
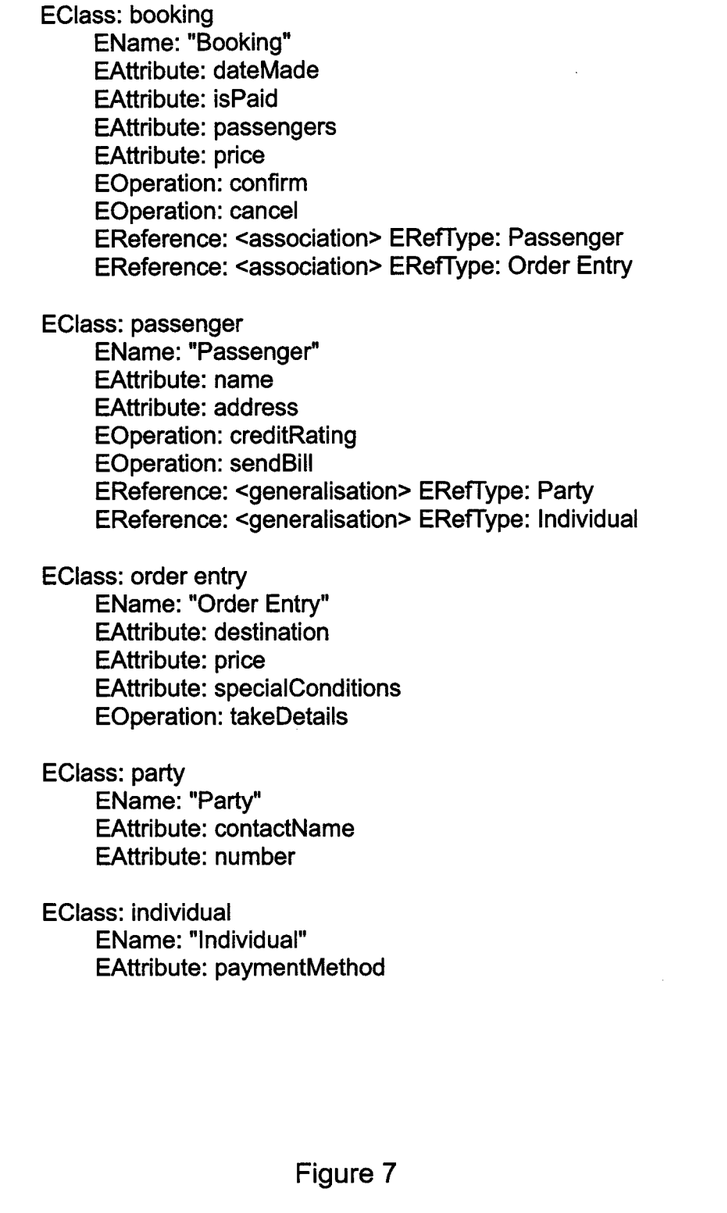
FIG. 7 is a meta-model language model created from the ontology of FIG. 5 in accordance with the mapping table of FIG. 4.
Figure 8:
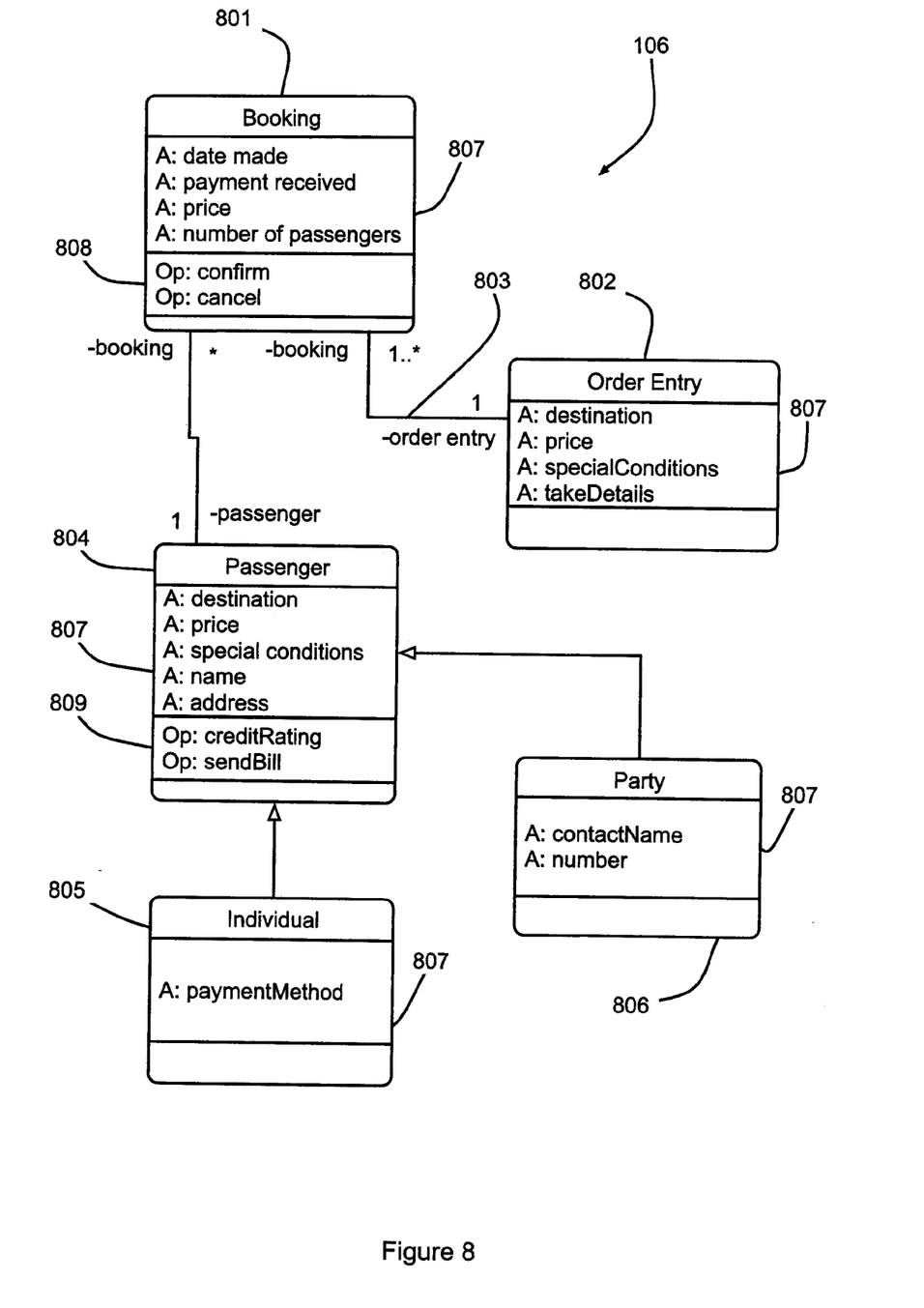
FIG. 8 is a UML model created from the meta-model language model of FIG. 7.

FIG. 7 shows the MML model 206 created for the whole sample FS 105 of FIG. 4, which describes the created Ecore structures. The MML model may be manually processed to produce a UML model diagram. In one embodiment, the MML model 206 is passed to the model creation module 203 for automatic conversion into the UML model 106. FIG. 8 shows the UML model 106 produced for the FS 105 from the MML model 206 of FIG. 7. The UML model comprises a first class 801 created from the noun phrase "booking (system)" and a second class 802 created from the noun phrase "order entry". The relationship 803 between the Classes 801 and 802 comprises an association resulting from the verb phrase "is accessed." Each of the classes 801 and 802 are populated with the relevant attributes from their respective noun phrases in the ontology 204. Thus, the first two classes 801, 802 and their relationship are derived from the first sentence of the FS 105 and correspond to the extracted ontology 204 of FIG. 5. The analysis of the remaining sentences of the FS 105 produces three further classes in the form of a "Passenger" class 804, "Individual" class 805 and "Party" class 806. The "Passenger" class 804 is associated with the "Booking" class 801. The "Individual" class 805 and "Party" class 806 are identified as generalizations to the "Passenger" class 804. Each of the classes 801, 802, 804, 805, and 806 comprises a number of attributes 807. In addition, the "Booking" class 801 and the "Passenger" class 804 each comprise operations 808 and 809, respectively. For example, the "cancel" and "confirm" operations 808 are derived from the corresponding transitive verbs in the second sentence of the second paragraph of the FS 105 shown FIG. 4.

Figure 9:
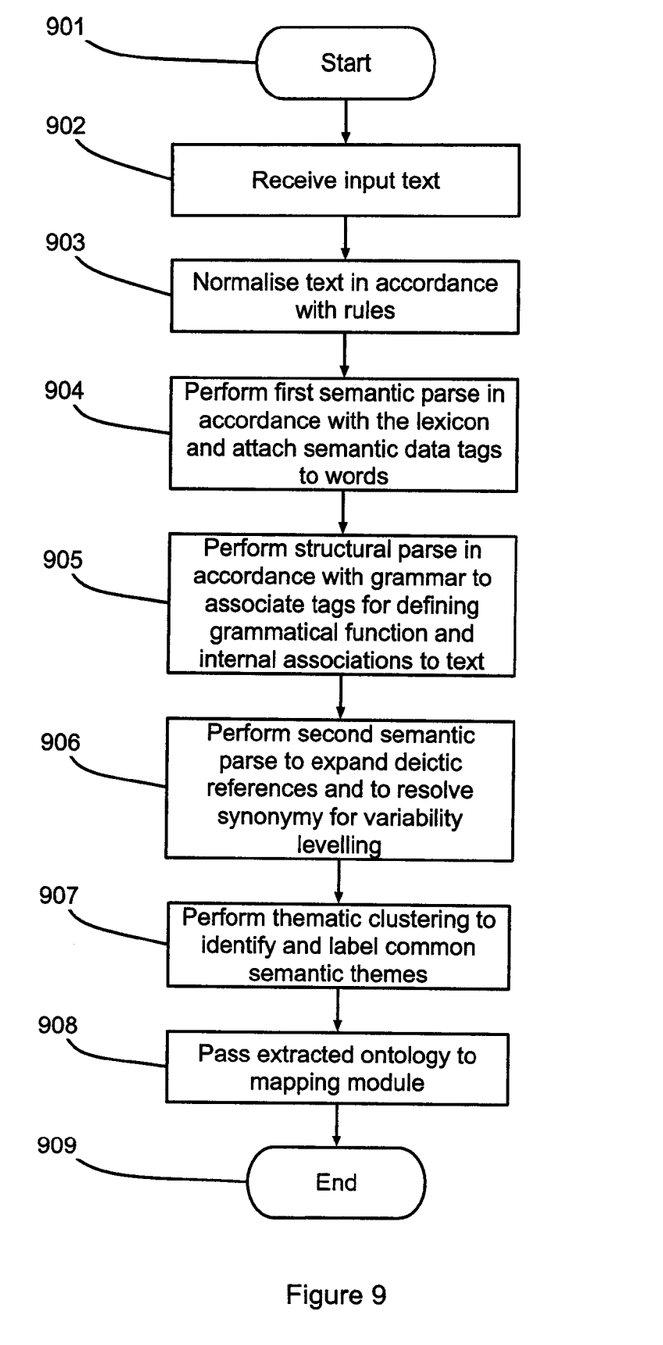
FIG. 9 is a flow chart illustrating the processing performed by the natural language processing module of FIG. 3 when extracting the ontology of FIG. 5.

The processing performed by the NLP module 201 will now be described with reference to the flow chart of FIG. 9. At step 901, processing is initiated in response to the start-up of the modeling application program 104 and then moves to step 902. At step 902, the FS 105 is input and processing moves to step 903. At step 903, the text of the FS 105 is normalized as described above, and processing moves to step 904. At step 904, the primary semantic parse of the FS 105 is performed in accordance with the lexicon 308 to add relevant semantic tags. The result of this processing step on the first sentence of the FS 105 is as follows:

The //+{DEFINITE}+{UNKNOWN ANTECEDENT}
booking system //+{ADMIN}+{AUTOMATION}+{SALES}
is //+{TO BE}+{PASSIVE}
accessed //+{ENTRY}+{RECIPIENT}
via //+{MEANS}+{OBJECT}
the //+{DEFINITE}+{UNKNOWN ANTECEDENT}
order //+{SALES}+{RECORD}
entry //+{ENTRY}+{RECIPIENT}
application //+{MEANS}+{AGENT}

From step 904 processing then moves to step 905 where the structural parsing is performed in accordance with the grammar 310 so as to tag the lexical items of the FS 105 and to identify any internal association as follows:

TOPIC (NP({DEF ARTICLE} (the) {COMPOUND NOUN} (booking system))

COMMENT (VP(V{PASSIVE} (is accessed PP({PREPOSITION} via {DEFINITE ARTICLE} (the) {COMPOUND NOUN} (order entry application)))

ASSOCIATION: "booking system"<>"order entry application" "booking system" {RECIPIENT} "order entry application" "order entry application" {AGENT} "booking system"

Processing then moves to step 906 where the second semantic parse of the FS is performed by the secondary semantic parser 304 in accordance with the rules 312 so as to expand anaphoric and deictic references and resolve synonymy for variability leveling. Examples of such resolutions of deictic references in the first paragraph and synonymy in the first and second paragraphs of the FS 105 are as follows:

the→referent "booking system"

this→referent "order entry application"

information→referent "the destination"+"the price"+"special conditions"

Processing then moves to step 907 where the semantic tags inserted by the primary semantic parser 302 are analyzed to identify any common semantic themes between the terms in the emerging ontology 204, and any such identified themes are labeled as associations or semantic containment relationships as follows:

<[booking system] associated with [order entry application]>

<[booking system] details contained [{date, number of passengers, whether paid}]>

In the above example, the "details contained" association identifies features that could be interpreted either as attributes of their respective head noun, that is "booking system", or as separate classes with a containment relationship from the head noun. As described further below, the mapping module 202 is arranged to use this semantic clustering data to determine if any of the "details contained" entries are associated with any other objects in the ontology. If so, they will be modeled as classes in their own right. If an entry has no other associations, it will become an attribute of the respective head noun class. Processing then moves to step 908 where the extracted ontology is passed to the mapping module 202 for further processing and ends at step 909.

Figure 10:
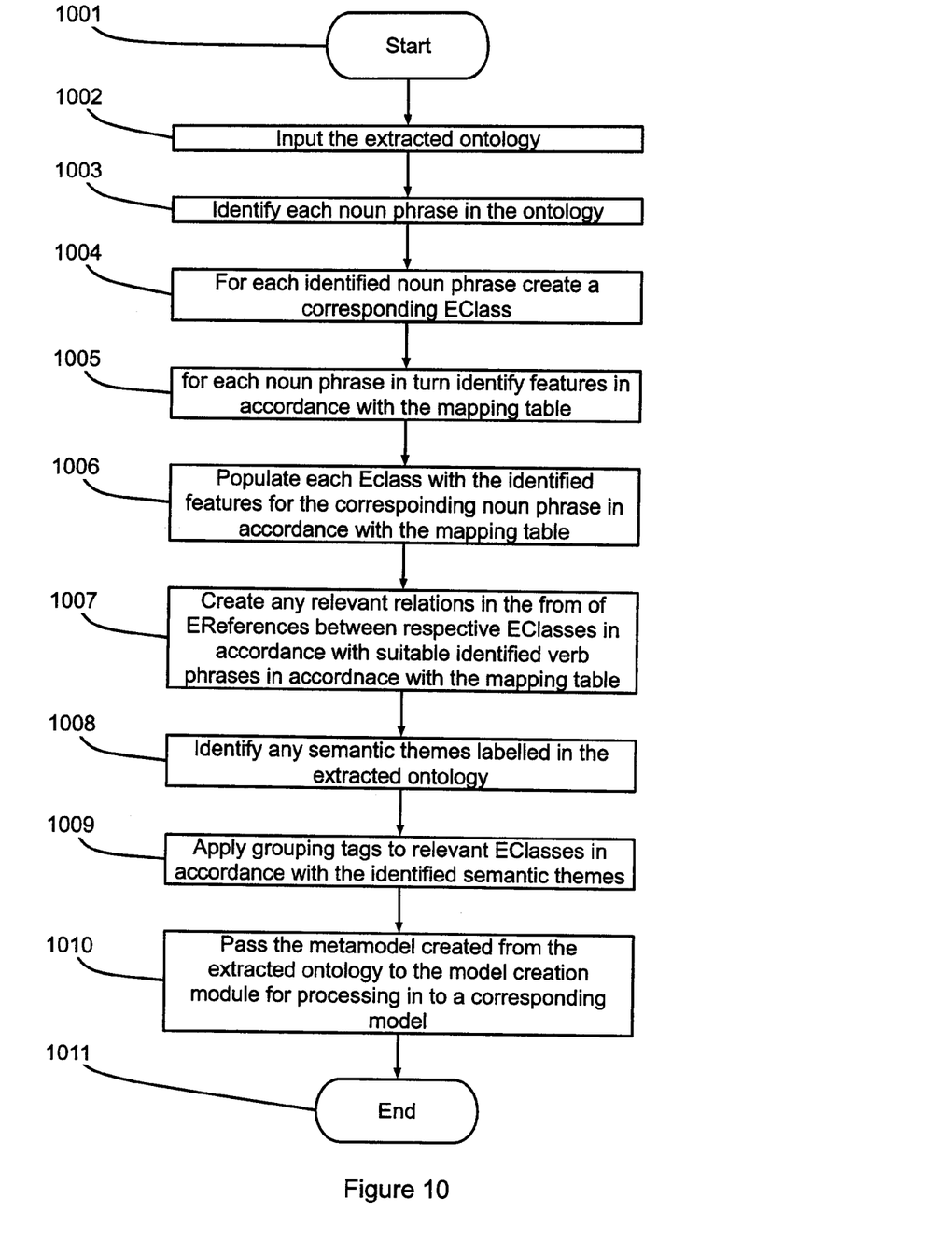
FIG. 10 is a flow chart illustrating the processing performed by the modeling application program when creating a meta-model language model from the ontology of FIG. 5.

The processing performed by the mapping module 202 when mapping a received ontology 204 to a MML model 206 will now be described in further detail with reference to the flow chart of FIG. 10. Processing is initiated at step 1001 in response to the start-up of the modeling application program 104 and processing moves to step 1002. At step 1002, the ontology 204 is input and processing moves to step 1003. At step 1003, each noun phrase in the ontology is identified and processing moves to step 1004. At step 1004, a corresponding EClass is created for each identified noun phrase and processing moves to step 1005. At step 1005, the relevant features for each new EClass are identified from the ontology in accordance with the mapping table 205. In addition, the mapping module 202 is arranged to use the semantic clustering data to determine if any of the "details contained" entries are associated with any other objects in the ontology. If so a new class is created for the relevant detail entry along with a containment relationship to its associated class. If a detail entry has no other associations, it is provided as an attribute for its associated class. Processing then moves to step 1006 where each new EClass is populated with the identified features and processing moves to step 1007.

At step 1007, any further relationships in the ontology 204, such as verb phrases, relevant to the created EClasses are identified in accordance with the mapping table 205. EReferences or EOperations are created for the relevant EClasses for the identified relationships in accordance with the mapping table 205 and as determined by the specified semantics of each given relationship. Processing then moves to step 1008 where any semantic theme clusters in the ontology 204 are identified and processing moves to step 1009. At step 1009, the identified semantic clusters are transferred to the MML model 206 by tagging the relevant EClasses with appropriate identifiers. FIG. 7 shows the MML model 206 produced for the extracted ontology 204 of FIG. 5. Processing then moves to step 1010 where the MML model 206 is passed to the model creation module 203 for conversion into the relevant UML model 106. FIG. 8 shows a fragment of the UML model 105 produced for the extracted ontology 204 of FIG. 5. Processing then ends at step 1011.

As will be understood by those skilled in the art, the ontology data that is extracted from the natural language text is determined by the lexicon, grammar and other rules used by the NLP module and, as such, may be modified to suit a particular application. Different sets of data may be extracted from the natural language and presented in the ontology for use by the modeling application program. Not all features identified in a given ontology may be mapped into MML model.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for extracting a system modeling meta-model language model for a system from a natural language specification of the system, comprising:

storing a natural language specification of a system in a computer memory;

extracting, with a computer processor, syntactic structure from said natural language specification of a system, said syntactic structure representing a set of at least one syntactic subject;

creating, with said computer processor, a first mapping between a predetermined said set of at least one syntactic subject and respective meta-model elements for a system modeling meta-model language, wherein said set of at least one syntactic subject comprises a noun phrase and said first mapping comprises a mapping of a respective noun phrase to said respective meta-model elements;

extracting, with said computer processor, further syntactic structure representing a set of at least one syntactic predicate corresponding to each of said set of at least one syntactic subject;

creating, with said computer processor, a second mapping between a predetermined set of at least one syntactic predicate and respective meta-model associations for said meta-model elements;

creating, with said computer processor, at least one respective meta-model relation for each corresponding meta-model elements in accordance with any corresponding syntactic predicate identified in said extracted further syntactic structure;

creating, with said computer processor, at least one of said respective meta-model elements in accordance with said first mapping for each identified said set of at least one syntactic subject;

extracting, with said computer processor, at least one semantic element from said natural language specification;

when a semantic element associated with a given predicate indicates that said given predicate is passive, a verb phrase from said given passive predicate is mapped, with said computer processor, as a meta-model reference between said meta-model elements for a corresponding subject and said meta-model elements for a corresponding object of said verb phrase, wherein a set of semantic elements comprises a set of optional semantic elements associated with said at least one of said subject or said object, which are mapped, with said computer processor, as at least one attribute of said corresponding meta-model elements;

when said given predicate is active, a verb phrase from said given active predicate is mapped, with said computer processor, to a meta-model operation for said meta-model elements corresponding to said subject;

said set of semantic elements comprises a set of optional semantic elements associated with said at least one of said subject or said object, which are mapped, with said computer processor, as at least one attribute of said corresponding meta-model elements, and thematic cluster data arranged to identify common semantic themes is determined from said set of optional semantic elements and transferred to said created at least one of said respective meta-model elements so as to enable the identification of said common semantic themes in said model of said system; and converting, with said computer processor, said created at least one of said respective meta-model elements into a model of said system.

2. A method according to claim 1, when said syntactic predicate comprises said noun phrase, said respective noun phrase is mapped, with said computer processor, to a further meta-model element in accordance with said first mapping.

3. A method according to claim 2 in which said further meta-model element are comprises meta-model classes.

4. A method according to claim 1 in which surface structure elements associated with each element of said syntactic structure or relation are transferred as labels for said corresponding meta-model elements or relationships.

5. A method according to claim 4 in which said extraction of said at least one semantic element comprises a variability leveling process for resolving semantic synonymy.

6. A method according to claim 5 in which said model is created using the Unified Modeling Language (UML).

7. A method according to claim 6 in which said meta-model language is Ecore.

8. A method according to claim 7 in which said natural language specification of a system is a high level functional specification (HLFS).

9. An apparatus for extracting a system modeling meta-model language model for a system from a natural language specification of the system, comprising:
 a processor; and
 memory connected to the processor, wherein the memory is encoded with instructions and wherein the instructions when executed comprise:
 instructions for storing a natural language specification of a system;
 instructions for extracting syntactic structure from said natural language specification of a system, said syntactic structure representing a set of at least one syntactic subject;
 instructions for creating a first mapping between a predetermined said set of at least one syntactic subject and respective meta-model elements for a system modeling meta-model language, wherein said set of at least one syntactic subject comprises a noun phrase and said first mapping comprises a mapping of a respective noun phrase to said respective meta-model elements;
 instructions for extracting further syntactic structure representing a set of at least one syntactic predicate corresponding to each of said at least one syntactic subject;
 instructions for creating a second mapping between a predetermined set of said at least one syntactic predicate and respective meta-model associations for said meta-model elements;
 instructions for creating at least one respective meta-model relation for each corresponding meta-model elements in accordance with any corresponding syntactic predicate identified in said extracted further syntactic structure;
 instructions for creating at least one of said respective meta-model elements in accordance with said first mapping for each identified said set of at least one syntactic subject;
 instructions for extracting at least one semantic element from said natural language specification;
 when a semantic element associated with a given predicate indicates that said given predicate is passive, instructions for mapping a verb phrase from said given passive predicate as a meta-model reference between said meta-model elements for said corresponding subject and said meta-model elements for a corresponding object of said verb phrase, wherein a set of semantic elements comprises a set of optional semantic elements associated with said at least one of said subject or said object are mapped as at least one attribute of said corresponding meta-model elements;
 when said given predicate is active, instructions for mapping a verb phrase from said given active predicate to a meta-model operation for said meta-model elements corresponding to said subject;
 instructions for mapping said set of semantic elements, comprising a set of optional semantic elements associated with said at least one of said subject or said object, as at least one attribute of said corresponding meta-model elements, and thematic cluster data arranged to identify common semantic themes is determined from said set of optional semantic elements and transferred to said created at least one of said respective meta-model elements so as to enable the identification of said common semantic themes in said model of said system; and
 instructions for converting said created at least one of said respective meta-model elements into a model of said system.

10. An apparatus according to claim 9, wherein when said predicate comprises said noun phrase, said respective noun phrase is mapped to a further meta-model element in accordance with said first mapping.

11. An apparatus according to claim 10, wherein said meta-model elements are meta-model classes.

12. An apparatus according to claim 9 in which surface structure elements associated with each element of said syntactic structure or relation are transferred as labels for said corresponding meta-model elements or relationships.

13. An apparatus according to claim 12 in which said extraction of said at least one semantic element comprises a variability leveling process for resolving semantic synonymy.

14. An apparatus according to claim 13 in which said model is created using the Unified Modeling Language (UML).

15. An apparatus according to claim 14 in which said meta-model language is Ecore.

16. An apparatus according to claim 15 in which said natural language specification of a system is a high level functional specification (HLFS).

17. A computer program product for extracting a system modeling meta-model language model for a system from a natural language specification of the system, the computer program product comprising a computer readable storage medium having computer readable program code embodied therewith, the computer readable program code comprising:
 computer readable program code configured to store a natural language specification of a system;
 computer readable program code configured to extract syntactic structure from said natural language specification of a system, said syntactic structure representing a set of at least one syntactic subject;
 computer readable program code configured to create a first mapping between a predetermined said set of at least one syntactic subject and respective meta-model elements for a system modeling meta-model language, wherein said set of at least one syntactic subject comprises a noun phrase and said first mapping comprises a mapping of a respective noun phrase to said respective meta-model elements;
 computer readable program code configured to extract further syntactic structure representing a set of at least one syntactic predicate corresponding to each of said at least one syntactic subject;
 computer readable program code configured to create a second mapping between a predetermined set of said at least one syntactic predicate and respective meta-model associations for said meta-model elements;
 computer readable program code configured to create at least one respective meta-model relation for each corresponding meta-model elements in accordance with any corresponding syntactic predicate identified in said extracted further syntactic structure;

computer readable program code configured to create at least one of said respective meta-model elements in accordance with said first mapping for each identified said set of at least one syntactic subject;

computer readable program code configured to extract at least one semantic element from said natural language specification;

when a semantic element associated with a given predicate indicates that said given predicate is passive, computer readable program code configured to map a verb phrase from said given passive predicate as a meta-model reference between said meta-model elements for a corresponding subject and said meta-model elements for a corresponding object of said verb phrase, wherein a set of semantic elements comprises a set of optional semantic elements associated with said at least one of said subject or said object are mapped as at least one attribute of said corresponding meta-model elements;

when said given predicate is active, computer readable program code configured to map a verb phrase from said given active predicate to a meta-model operation for said meta-model elements corresponding to said subject;

computer readable program code configured to map said set of semantic elements, comprising a set of optional semantic elements associated with said at least one of said subject or said object, as at least one attribute of said corresponding meta-model elements, and thematic cluster data arranged to identify common semantic themes is determined from said set of optional semantic elements and transferred to said created at least one of said respective meta-model elements so as to enable the identification of said common semantic themes in said model of said system; and computer readable program code configured to convert said created at least one of said respective meta-model elements into a model of said system.

18. The computer program product according to claim 17, wherein when said predicate comprises said noun phrase, computer readable program code configured to map said respective noun phrase to a further meta-model element in accordance with said first mapping.

19. The computer program product according to claim 18, wherein said meta-model elements are meta-model classes.

20. The computer program product according to claim 17, computer readable program code configured to transfer surface structure elements associated with elements of said syntactic structure or relation as labels for said corresponding meta-model elements or relationships.

\* \* \* \* \*